(12) United States Patent
Lagathu et al.

(10) Patent No.: US 8,827,570 B2
(45) Date of Patent: Sep. 9, 2014

(54) SUBMARINE OPTICAL CONNECTOR

(75) Inventors: Cedric Lagathu, Louplande (FR); Christophe Prel, La Fleche (FR)

(73) Assignee: Carrier Kheops Bac, Allonnes (FR)

( * ) Notice: Subject to any disclaimer, the term of this patent is extended or adjusted under 35 U.S.C. 154(b) by 537 days.

(21) Appl. No.: 13/196,414

(22) Filed: Aug. 2, 2011

(65) Prior Publication Data

US 2012/0033916 A1  Feb. 9, 2012

(30) Foreign Application Priority Data

Aug. 3, 2010 (FR) .................................... 10 56407

(51) Int. Cl.
*G02B 6/36* (2006.01)
*G02B 6/38* (2006.01)
*G02B 6/44* (2006.01)

(52) U.S. Cl.
CPC ............ *G02B 6/3816* (2013.01); *G02B 6/3866* (2013.01); *G02B 6/3873* (2013.01); *G02B 6/3885* (2013.01); *G02B 6/4428* (2013.01)
USPC ..................... 385/56; 385/52; 385/58; 385/59

(58) Field of Classification Search
CPC .................................................... G02B 6/3816
See application file for complete search history.

(56) References Cited

U.S. PATENT DOCUMENTS

| 4,432,603 | A | 2/1984 | Morency et al. | |
| 6,206,579 | B1 * | 3/2001 | Selfridge et al. | 385/60 |
| 6,315,461 | B1 | 11/2001 | Cairns | |
| 2003/0007738 | A1 * | 1/2003 | Cairns et al. | 385/56 |
| 2008/0205831 | A1 | 8/2008 | Prel et al. | |
| 2009/0097799 | A1 | 4/2009 | Sakurai et al. | |

FOREIGN PATENT DOCUMENTS

| EP | 538089 A1 * | 4/1993 |
| EP | 2 053 433 A1 | 4/2009 |
| FR | 2 885 421 A1 | 11/2006 |
| WO | 86/02173 A1 | 4/1986 |
| WO | 01/40837 A2 | 6/2001 |

OTHER PUBLICATIONS

Google Translation of EP 0538089 B1, Apr. 1993, col. 9, lines 25-30.*
Google Translation of EP 0538089 B1, Apr. 1993, col. 6, lines 1-4.*
French Search Report—FR 10 56407 dated Mar. 8, 2011.

* cited by examiner

*Primary Examiner* — Michelle R Connelly
(74) *Attorney, Agent, or Firm* — Sughrue Mion, PLLC

(57) ABSTRACT

A submarine optical connector (1), comprising:
 a first support element (11) for supporting a first optical fiber, said first support element including at least one alignment pin (31, 31'),
 a second support element (12) for supporting a second optical fiber, said second support element including at least one through hole intended to receive respectively said at least one alignment pin to guide the first and second support elements towards a contact position in which the first and second fibers are connected, and
 sealing means (41, 42, 43) to protect the first and second fibers from the external environment at least when the first and second support elements are in the contact position.

13 Claims, 4 Drawing Sheets

SUBMARINE OPTICAL CONNECTOR

Figure 1:
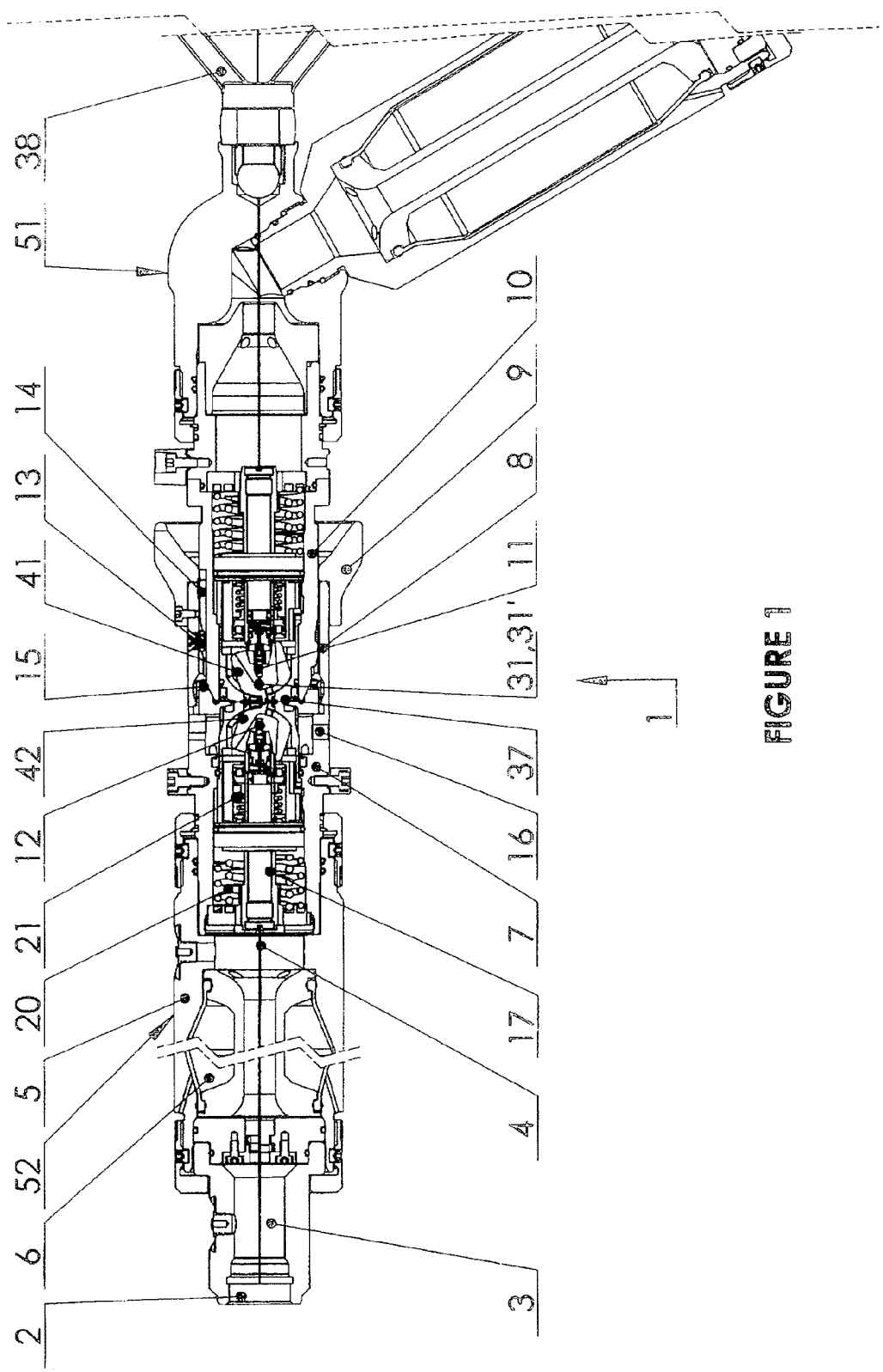

The invention relates to a submarine optical connector.

Submarine optical connectors are arranged to connect two (or more) optical fibres while under water.

These connectors may in particular be used for the underwater extraction of fuels. Specifically, around a drilling well, there are usually a certain number of sensors, pressure, temperature or other such sensors, in order to produce a mapping of the region to be drilled or that has been drilled. The optical fibre can be used to enable these sensors to communicate with an extraction platform. The optical fibre notably has the advantage of being relatively insensitive to the surrounding electromagnetic fields.

Thus, an optical connector may be used to connect one or other of the sensors to the platform. The submarine optical connectors are arranged so as to be able to be connected and disconnected under water. The optical fibre contact parts may be cleaned by gel to dispel any impurities likely to disrupt the transmission of the signal by the contact between the contact parts.

Ferule optical connectors have been used. For each pair of optical fibres (or channel) to be connected, two support elements are provided that can each support a corresponding fibre and come into contact with one another, as well as a sleeve to ensure the correct alignment of the fibres.

There is a need for a submarine optical connector that offers better performance.

There is proposed a submarine optical connector comprising:
- a first support element for supporting a first optical fibre, this first support element including at least one alignment pin,
- a second support element for supporting a second optical fibre, this second support element including at least one through hole intended to receive respectively the at least one alignment pin to guide the first and second support elements towards a contact position in which the first and second fibres are connected, and
- sealing means to protect the first and second fibres from the external environment at least when the first and second support elements are in the contact position.

Thus, the pin and the through hole form a means for aligning the support elements relative to one another which favours the circulation of fluid in the fibre contact region. Prior to the connection, a liquid, for example a gel, may easily circulate between the support elements to dispel any impurities, unlike in the submarine optical connectors of the prior art for which the alignment sleeve creates a cavity.

The contact between fibres is thus assured without impurities, which makes it possible to obtain better optical transmission performance levels, notably in terms of insertion losses and to minimize the reflection rate or reflection losses (better known as "back reflection").

Advantageously, and in a nonlimiting manner, the alignment means may include at least two pins and at least two corresponding through holes. The alignment means formed by the pins and the corresponding through holes may be arranged so as to prevent, in the contact position, any relative movement of a support element relative to the other in a direction which is not colinear to a longitudinal axis of the pins and of the holes. Thus, each support element may support a plurality of first or second optical fibres. The connection of the plurality of pairs of optical fibres may thus be made with fewer adjustments than in the prior art, in which there are as many pairs of support elements as there are channels (or pairs of fibres).

Furthermore, the concentration of optical fibres on a single pair of support elements allows to limit the quantity of liquid to be used for each cleaning.

The risks associated with a nonuniform distribution of the gel between the different channels are also limited.

Advantageously, and in a nonlimiting manner, the submarine optical connector may comprise a fibre array, notably a MT ferule. The submarine optical connector is thus relatively robust and may thus be manipulated by a robot.

The invention is in no way limited to the MT ferules. For example, the submarine optical connector may comprise a glass block fibre array, or similar.

Advantageously, and in a nonlimiting manner, the connector may comprise two parts each comprising a corresponding support element, each part including a sealing means to ensure the seal-tightness of the corresponding part in the disconnected state. Thus, a first part comprises the first support element and a first sealing means, and a second part comprises the second support element and a second sealing means.

Advantageously, and in a nonlimiting manner, the connector includes a third sealing means to protect the connector in the connected state from the external environment, for example a turbid environment.

Advantageously, and in a nonlimiting manner, the connector is constructed so that the first and second sealing means switch from a seal-tight closed position to an open position when the third sealing means is in a position of protection from the external environment.

Thus, in the disconnected state, the support elements and the optical fibres are protected from the external environment by the first and second sealing means, these sealing means remaining active at least until the third sealing means in turn makes it possible to protect the connector in the connected state. The support elements and the optical fibres are thus relatively protected from the external environment, which makes it possible to limit the quantities of impurities to be cleaned and therefore the quantity of gel needed for a cleaning of the contact parts.

Advantageously, and in a nonlimiting manner, the third sealing means comprises a seal arranged at one end of one of the parts to ensure seal-tightness in the connected state.

Advantageously, and in a nonlimiting manner, the seal may be constructed so as to allow the circulation of liquid inside the connector towards the outside, and to prevent the circulation of liquid in the reverse direction.

Thus, the connector is arranged so as to allow for the expulsion of cleaning gel and to protect the inside of the connector from the surrounding environment.

Advantageously, and in a nonlimiting manner, the connector includes means for maintaining a clearance between the first part and the second part, for example one or more studs mounted on the end of one of the parts. This clearance between the parts allows for the passage of the gel being evacuated.

Advantageously, and in a nonlimiting manner, at least one of the first and second sealing means comprises a shutter ("obturateur" in French) which can switch from the seal-tight closed position to the open position by pivoting about an axis substantially perpendicular to a longitudinal axis of the connector in order to align the shutter with this longitudinal axis.

Thus, in the seal-tight closed position, the shutter is inclined relative to the longitudinal axis, so that when a robot (or other) pushes one part of the connector against the other, a piece abutting against the shutter pushes the shutter towards the open position. The shutter may therefore be opened as part of a simple push by a robot, with no specific command.

Advantageously, and in a nonlimiting manner, a spring can be used to return the shutter to the inclined position when the abutting piece is withdrawn, during a disconnection. The shutter thus reverts to the seal-tight closed position, protecting the corresponding fibre from the surrounding environment.

Advantageously, and in a nonlimiting manner, the first and second sealing means comprise such a shutter.

Advantageously, and in a nonlimiting manner, each shutter includes a engagement element, the two engagement elements being able to be engaged with one another. The opening of the shutters is thus synchronized. In practice, it may be that one of the shutters is seized, for example because of a grain of sand: the synchronization of the openings makes it possible to prevent this shutter from remaining in the seal-tight closed position, which would lead to degradations on the support element and/or the fibre of the other part of the connector, abutting, under the effect of the push from the robot, against the shutter that has remained closed.

Advantageously, and in a nonlimiting manner, at least one connector part, and preferably both connector parts, include a window that can be blocked by the corresponding shutter.

Advantageously, and in a nonlimiting manner, at least one and preferably both windows include an edge designed to avoid the build-up of impurities on this edge. For example, the edge includes a seal with teeth. In fact, in the disconnected state, the window of each connector part is in contact with the ambient environment, so that impurities are likely to be deposited on the edge of the window and to pollute the inside of the connector when the shutter is opened. A shrewd design of the edge of the window with teeth can make it possible to limit the quantity of hampering impurities.

Advantageously, and in a nonlimiting manner, the connector includes means for roughly aligning the two connector parts, for example a key/groove system.

Advantageously, and in a nonlimiting manner, the connector includes at least one, and preferably two, ball joints attached to the corresponding support elements to compensate for alignment defects.

Advantageously, and in a nonlimiting manner, the submarine optical connector may include a reserve of gel for cleaning the inside of the connector.

Advantageously, and in a nonlimiting manner, the submarine optical connector is constructed so that, in case of thrust, internal movements occur, so that the internal volume is reduced. The internal pressure increases, and gel present in this internal volume is expelled through the passage between the two connector parts and the seal protecting these two parts from the external environment, thus producing a cleaning of the inside of the connector.

More particularly, at least one connector part may be constructed so as to define a chamber whose volume increases when the part undergoes compression forces resulting in a switch from the seal-tight closed position to the open position of the corresponding sealing means.

This volume is filled with gel, which may make it possible to limit the quantity of gel expelled on opening the shutters, and therefore to avoid running out of gel on this first cleaning.

Figure 2:
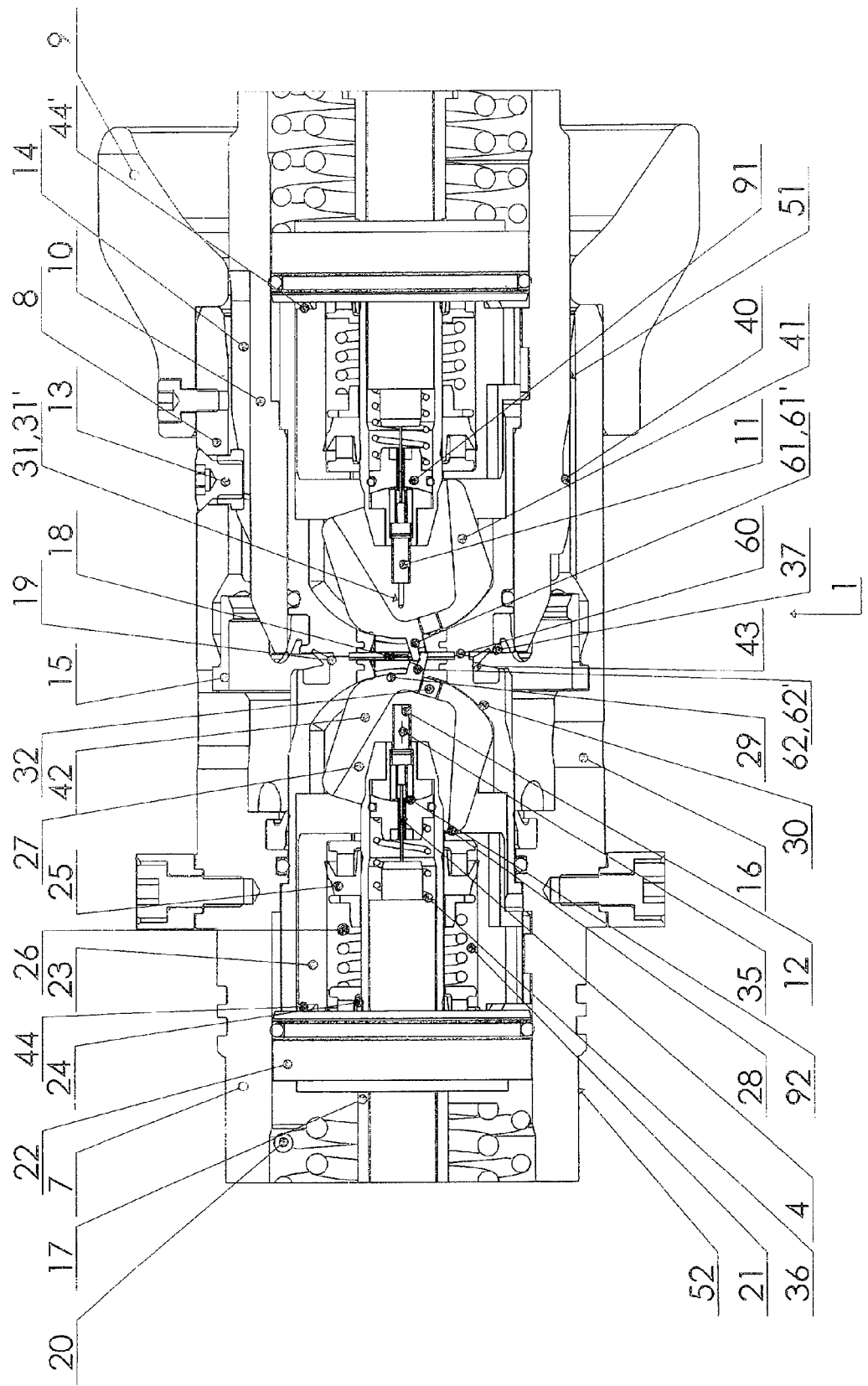
Figure 3:
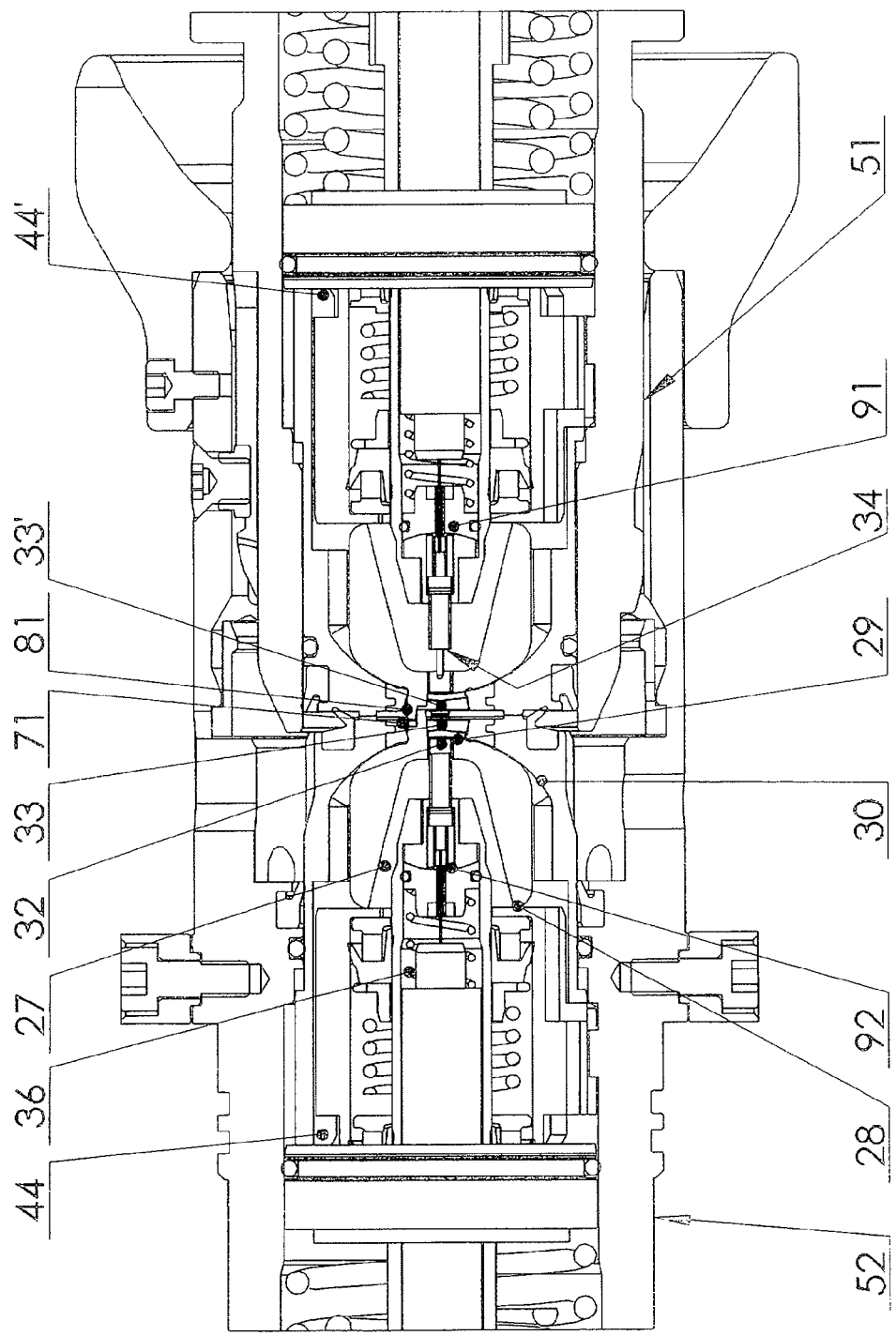
Figure 4:
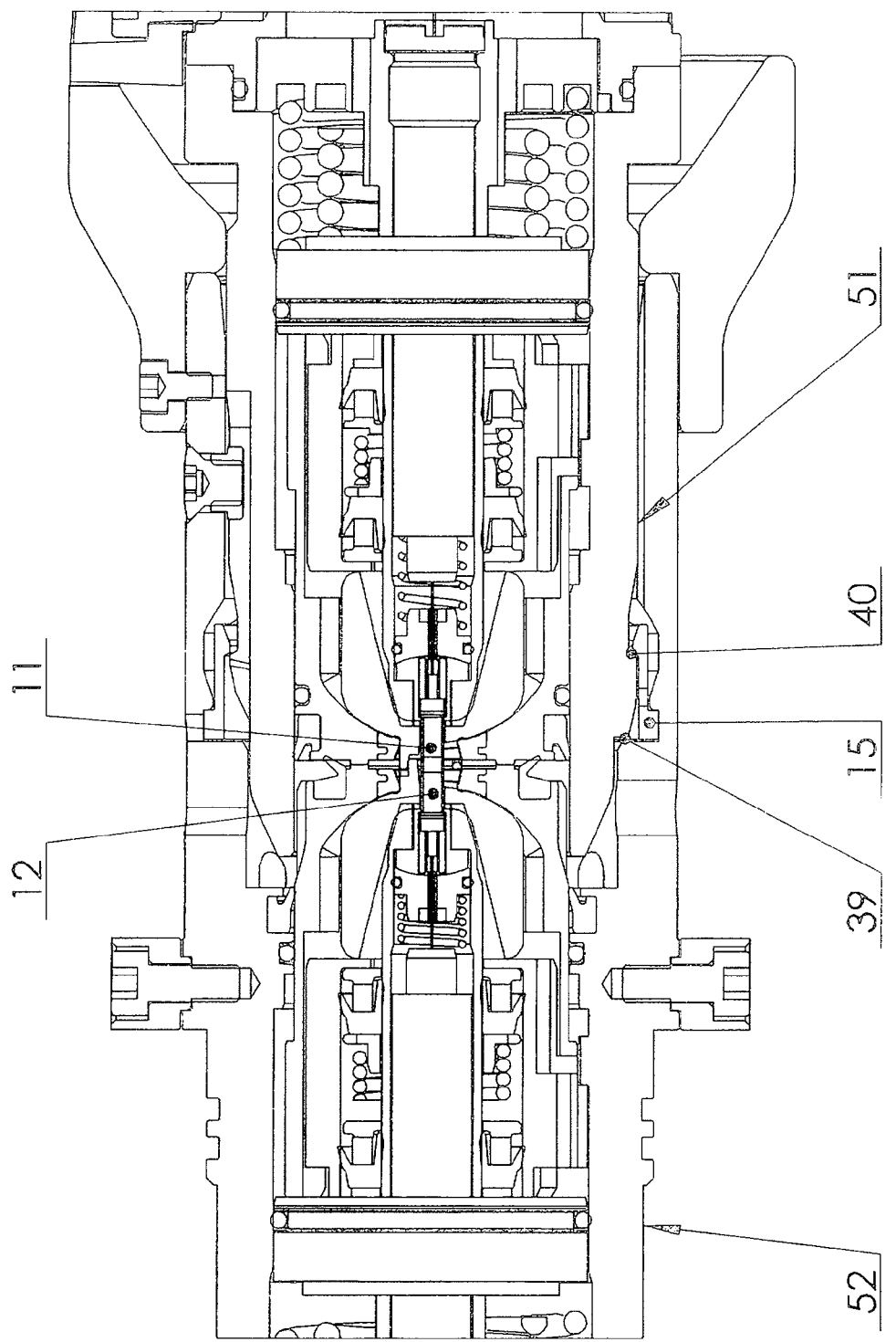

Embodiments of the invention are now described with reference to the appended drawings, in which:

FIG. 1 is an axial cross-sectional view of an optical connector, plug and socket parts in the disconnected position according to one embodiment of the invention, FIG. 2 is a partial axial cross-sectional view of the connector of FIG. 1 during connection, at the moment when the third sealing means comes into service and before the opening of the first and second sealing means, FIG. 3 is an axial cross-sectional view of the connector similar to FIG. 2 showing the opening of the first and second sealing means or front face shutters of the plug and socket parts of the connector, FIG. 4 is a view similar to that of FIG. 2 showing the optical connector in the connected position.

Hereinafter, identical or similar parts in the drawings will be designated by the same numerical references.

The optical connector 1, intended for a submarine application, as represented in FIG. 1, comprises a fixed part or socket 52 and a mobile part or plug 51 intended to be plugged into the socket 52.

The plug 51 and the socket 52 respectively include a first and a second sealing means, in this case shutters 41, 42.

The socket 52 is of cylindrical configuration and includes, in succession, from left to right, as represented in the drawing, a rear part 2 intended to be hermetically linked to an optical cable 3 comprising of optical fibres 4 (taped or not), a body part 5 housing in particular a reservoir 6 of gel or optical fluid for cleaning the contact parts (at the periphery of the passage of the optical fibres 4), a part 7 housing the active contact elements, and a front part in the shape of a sleeve 8 coaxially linked to the part of the body 5.

The front part in the shape of a sleeve 8 (see also FIG. 2) has an outwardly flared opening 9 at its end and is intended to receive and guide the front part 10 (complementary) of the plug to the connection.

This front part 8 includes a key element 13 (screw) protruding from its internal wall and intended to guide the plug 51 in a determined angular orientation (parallel to the plane of the drawing) via a groove 14 of the plug with a section complementing the key 13. This front part 8 also includes a clip 15 for locking the plug in the connected position and holes 16 for the passage of gel or optical fluid in the wall of the body part 5.

The part 7 housing the active contact elements comprises, in succession from left to right in the drawing, a part 17 supporting the optical fibres 4, an optical fibre support element 12, for example an MT ferule element, and a shutter 42 for a window 18 formed on the front face 19 of the body part forming the second sealing means to ensure the seal-tightness of the socket 52 in the disconnected position.

The optical fibre support part 17 is arranged in the axis of the socket, being linked to the optical cable 3. This part 17 is of cylindrical conformation and around this part there are, in succession from left to right, a set of powerful helical springs 20, a gel chamber 21 forming the gel pump and the shutter 42.

All the helical springs 20 are applied against a piston element 22 mounted to slide in a seal-tight manner on a rear skirt 23 of the gel chamber 21.

The gel chamber 21 is cylindrical and houses two V-shaped lip seals at its ends, a first fixed seal 24 and a second seal 25 close to the shutter 42 and mounted to move in the bore of the gel chamber, this seal being held in position relative to the first 24 by an internal helical spring 26 arranged between these two seals 24, 25. The second seal 25 operates as a valve seal, this arrangement making it possible to allow fluid to pass toward the outside under pressure via the periphery of the second seal 25 in the shutter 42 when the volume of the gel chamber 21 is reduced, which gel chamber 21 slides on the support part 17 because of the thrust of the shutter on connection, and to suck gel from the gel reservoir in return, on disconnection, gel then being introduced through the first seal 24.

The shutter 42 includes a central U-shaped internal void 27, outwardly flared at its ends, in which it receives the end part of the support part 17, including the support element or MT ferule 12 at the end of the support part 17.

This shutter 42 is applied in the unconnected position in an inclined manner to a vertical end face 28 of the gel chamber, being held in this inclined position by a spring element which is not represented. The shutter 42 is mounted to move in rotation, its front face 29 sliding in a ball joint cage 30, so as to come into position coaxial to the axis of the socket under the thrust of the face 28 of the gel chamber.

The shutter 42 also includes an opening 32 at the top of the void 27 intended to allow the passage of the MT ferule, on connection, in position coaxial to the axis of the socket. This opening 32, in the coaxial position of the shutter, is facing a window 33 of the front face 19 (FIG. 3) whose edge 71 is grooved (according to the grooves or teeth 81) to prevent the build-up therein of dirt from the external environment.

The shutter 42 also includes a set of two fingers 62, 62' offset heightwise relative to one another and protruding in the inclined position of the shutter 42 into the window 33, the shutter 42 closing the window 33 in the inclined position.

The support element 12 or MT ferule, includes a set of one to n optical contacts (up to 48, or even 72 optical fibre contacts) each supporting the end of the optical fibres 4. The support element 12 pivots on a ball joint 92 at its rear end, being held in line by a helical link spring 36. This MT ferule includes two through holes 35 (shown by broken lines) separated from one another and arranged in a plane horizontal and perpendicular to that of the drawing. These through holes are intended to receive the (complementary) pins 31, 31' of a support element 11 mounted on the ball joint 91 of the plug (FIG. 2). The pins are tapered at their end to further compensate for any alignment defects.

The plug 51 of the connector (FIG. 2) complements the socket 52 and includes the same elements in symmetry relative to the plane of connection of their front face 37 and 19, respectively. The optical fibre support element 11 of the plug notably includes the two pins 31, 31' intended to penetrate into the through holes 35 of the optical fibre support element 12 of the socket.

Finally, the front face 19 of the body part of the socket includes a lip seal 43 flared towards the outside and intended to bear against the front face 37 of the plug on connection, this seal 43 allowing for the expulsion of gel from the inside of the connector towards the outside, on connection, but preventing any ingress from the external environment.

This seal therefore constitutes a third sealing means, to protect the connector 1 from the external environment when the plug 51 and the socket 52 are connected together.

Studs 60 are also provided on the front faces 19 and 37 to form a space of clearance on connection between the front face 37 of the plug and the front face 19 of the socket (connection plane).

There now follows a description of how the connector operates on connection.

The plug 51 is engaged by rough alignment in the sleeve 8 of the socket 52, by means of a robot or similar (not represented) operating the handle 38 of the plug. The plug 51 is offered up appropriately oriented at an angle to the socket and the plug is guided through the opening 9 in the sleeve of the socket 8 by means of the abovementioned key 13 and groove 14 system.

The lip seal 43 and the studs 60 of the socket come into contact with the front face 37 (FIG. 2).

The engaging fingers 61, 61', 62, 62' of each of the shutters catch on one another, two by two crosswise in the manner of a gear.

As the engagement of the plug continues, the shutters 41, 42 are pushed by their rear face onto the front face 28 of the corresponding gel chamber and they are rotated synchronously by virtue of the engaging fingers 61, 61', 62, 62' in alignment with the axis of the connector, opening the windows 33, 33' of the front faces of the socket and of the plug (FIG. 3).

The gel chamber 21 is then compressed and gel from the chamber is expelled at the periphery of the second seal 25 of the chamber as mentioned previously, as far as into the shutter (and symmetrically for each of the shutters 41, 42), onto the support elements 11, 12 (including the front faces of the fibre contacts 34 in order to clean them), and through each of the windows 33, 33' into the space of play of the connection plane. A portion of the gel is evacuated from the front face space of play through the lip seal 43 without the external medium being able to enter therein.

The connector also includes a chamber 44 (44' for the plug) external to the gel chamber 21 and whose gel-filled volume increases under the action of the springs 20 at the moment of the opening of the shutter 42. This chamber 44 and similarly the chamber 44', makes it possible to limit the quantity of gel expelled on opening the shutters, and therefore to avoid using up gel on this first cleaning.

Then, the fibre support elements 11, 12 of each of the connector parts, plug and socket, are brought together. The pins 31, 31' of the MT ferule of the plug enter into the complementary through holes 35 of the MT ferule of the socket, being engaged in them by their point. The support elements 11, 12 can each pivot by their ball joint 91, 92 under the guidance of the pins in the holes, to compensate for an alignment defect of the pins and holes. These pins are pressed completely into the corresponding through holes, whereas, under the compression of the gel chamber 21, gel continues to be evacuated in order to clean the contacts and the connection plane 34. The fibre end contact 34 of the optical fibre support elements 11, 12 is then established, the link springs 36 damping the contact abutment of the support elements 11, 12.

The plug can be pressed in to abut 39 on the socket and return slightly backwards at the end of connection, the locking clip 15 catching in a corresponding internal annular groove 40 of the sleeve of the plug.

The connector is now locked in the connected position (FIG. 4).

The disconnection procedure (not represented) is the reverse of the abovementioned connection procedure.

The pulling by the robot on the plug releases the clip 15 from the internal groove 40 of the sleeve and the plug can then come out of the socket. The springs 20, 26, 36 compressed on connection expand to return the parts to their original position. Thus, the pins 31, 31' leave the through holes 35 and the support elements 11, 12 are separated from one another returning into each of the respective plug and socket parts whereas the shutters 41, 42 close before the front face 37 of the plug is separated from the front face 19 of the socket.

That done, the gel chamber 21 reverts to its original volume and is refilled with gel introduced through the periphery of the chamber seal 24, pending a new connector connection cycle. The plug and socket are then disconnected and insulated from the external environment.

The invention claimed is:

1. A submarine optical connector, comprising:
   a first support element for supporting a first optical fibre, said first support element including at least one alignment pin,
   a second support element for supporting a second optical fibre, said second support element including at least one through hole intended to receive respectively said at least one alignment pin to guide the first and second support elements towards a contact position in which the first and second fibres are connected, and sealing means to protect the first and second fibres from the external environment at least when the first and second support elements are in the contact position, said connector being arranged to perform a cleaning, prior to a connection between the support elements inside the connector, by circulation of a cleaning liquid between the support elements to dispel any impurities from the optical contact areas of the fibres, and to allow for the expulsion of the cleaning liquid from inside the connector to the external environment after the cleaning.

2. The submarine optical connector according to claim 1, in which the first support element includes at least two alignment pins and the second support element includes at least two through holes intended to receive respectively said at least two alignment pins, characterized in that the first support element is arranged to support a plurality of first optical fibres, and the second support element is constructed to support a plurality of second optical fibres so that, in the contact position, each first optical fibre is connected to a corresponding second optical fibre.

3. The submarine optical connector according to claim 1, including a fibre matrix.

4. The submarine optical connector according to claim 1, comprising at least one ball joint attached to a corresponding support element to compensate for any alignment defects.

5. The submarine optical connector according to claim 1, further comprising:

a first part comprising the first support element, a second part comprising the second support element, wherein the sealing means comprise a first sealing means to ensure the seal-tightness of the first part when said first part is disconnected from the second part, a second sealing means to ensure the seal-tightness of the second part when said second part is disconnected from the first part, and a third sealing means to protect the connector from the external environment when the first and second parts are connected together, and wherein the connector is arranged so that the first and second sealing means switch from a seal-tight closed position to an open position when the third sealing means is in a position of protection from the external environment.

6. The submarine optical connector according to claim 5, wherein the third sealing means comprises a seal capable of allowing the circulation of liquid inside the connector towards the outside and of preventing the circulation of liquid in the reverse direction when the first and second parts are connected together, and wherein the connector includes at least one stud to maintain a clearance between the first part and the second part when said parts are connected together for the passage of cleaning gel towards the outside of the connector.

7. The submarine optical connector according to claim 5, wherein at least one of the first and second sealing means comprises a shutter which can switch from the seal-tight closed position to the open position by pivoting about an axis substantially perpendicular to a longitudinal axis of the connector in order to align the shutter with this longitudinal axis.

8. The submarine optical connector according to claim 7, wherein the first and the second sealing means each comprise a shutter, each shutter includes an engaging element, and the two engaging elements are able to be engaged with one another on the transition to the open position.

9. The submarine optical connector according to claim 5, wherein at least one of the connector parts includes a window likely to be closed by the corresponding sealing means, characterized in that the window includes an edge with teeth to limit the build-up of impurities on said edge.

10. The submarine optical connector according to claim 5, wherein at least one connector part can be constructed so as to define a chamber whose volume increases when the part undergoes compression forces resulting in the switch from the seal-tight closed position to the open position of the corresponding sealing means.

11. The submarine optical connector according to claim 1, wherein the cleaning liquid is a gel.

12. The submarine optical connector according to claim 11, wherein the connector further comprises a gel chamber from which the gel is expelled into an area permitting front faces of the fibre contacts to be cleaned prior to optical contact.

13. The submarine optical connector according to claim 1, wherein the cleaning liquid is expelled through a passage to the external environment, which prevents reverse flow of fluid from the external environment to the inside of the connector.

* * * * *